United States Patent

[11] 3,617,895

[72] Inventors Stanley J. Tomsa
Chicago;
David F. Willard, Schaumburg, both of Ill.

[21] Appl. No. 848,627

[22] Filed Aug. 8, 1969

[45] Patented Nov. 2, 1971

[73] Assignee Motorola, Inc.
Franklin Park, Ill.

[54] MULTIFREQUENCY RECEIVER WITH AUTOMATIC CHANNEL SELECTION AND PRIORITY CHANNEL MONITORING
9 Claims, 3 Drawing Figs.

[52] U.S. Cl. .......... 325/334, 325/469, 325/470

[51] Int. Cl. .......... H04b 1/32

[50] Field of Search .......... 325/2, 3, 31, 56, 67, 334, 335, 363, 438, 452, 453, 464, 468, 469, 470; 343/205, 206; 331/179

[56] References Cited

UNITED STATES PATENTS 3,470,481 9/1969 Myers et al. .......... 325/31 X 3,497,813 2/1970 Gallagher .......... 325/453 X

*Primary Examiner*—Benedict V. Safourek
*Attorney*—Mueller and Aichele

ABSTRACT: A switching system for a receiver with a plurality of local oscillators for operating on different channels renders the oscillators operative in turn, with the switching system being latched when a carrier is received to hold the receiver on the channel having the carrier. One channel is designated a priority channel, and the oscillator for that channel is operated at recurring short periods when another channel is being received in order to continually sample the priority channel. If a signal is detected on the priority channel during the sampling interval, the receiver locks onto the priority channel until the carrier on that channel terminates. The length of time that the priority channel is sampled during reception on another channel is variable in that there are no circuit time constants which force the circuitry to return to the nonpriority channel after a fixed length of time. When the system samples the priority channel, it stays on the priority channel until noise is detected. If a marginal signal is on the priority channel or if a statistical noise null is present, the sample length is extended until noise reappears on the priority channel.

INVENTORS
STANLEY J. TOMSA
DAVID F. WILLARD
BY
Mueller, Aichele & Rauner
ATTYS.

INVENTORS
STANLEY J. TOMSA
DAVID F. WILLARD
BY
Mueller, Aichele & Rauner
ATTYS.

MULTIFREQUENCY RECEIVER WITH AUTOMATIC CHANNEL SELECTION AND PRIORITY CHANNEL MONITORING

BACKGROUND OF THE INVENTION

Multifrequency receivers are known having automatic switching apparatus for selecting tuning elements to provide reception on a plurality of different channels. The channels may be selected by an automatic control system which selectively connects different tuned circuits in the receiver circuit until a carrier wave is detected on a channel, at which time the automatic switching is terminated.

In some cases, it is desirable to assign a priority to one of the channels and to receive this channel at all times during which a signal may be transmitted thereon. In a system having such a priority channel, it is necessary to continually sample the priority channel during the reception of signals on other channels and to lock onto the priority channel whenever a carrier is detected thereon during the sampling interval.

For systems providing such priority operation, the length of time that the priority channel is sampled during the reception on another channel generally is a fixed length sampling interval, so that if a statistical noise null or a marginal signal is present on the priority channel at the time the sample is made, the circuitry locks onto the priority channel and stays locked to the priority channel for full length of time assigned as fade protection. Although it is desireable to have the priority channel selected whenever a signal is present thereon, it is undesirable to provide a system which can mistakenly lock onto the priority channel for these nonsignal conditions since large portions of the nonpriority audio signal are lost when this occurs.

SUMMARY OF THE INVENTION

Accordingly, it is an object of the present invention to provide a multifrequency superheterodyne receiver operable on a plurality of channels with a channel switching system which continuously monitors a priority channel even during reception on another channel.

It is a further object of this invention to continuously monitor a priority channel in a multifrequency receiver with a switching system which is disabled when a carrier is received on the priority channel.

It is still another object of this invention to sample the priority channel in a multifrequency receiver periodically during reception of a nonpriority channel, with the sampling of the priority channel being variable lengths of time according to the signal conditions on the priority channel.

In accordance with a preferred embodiment of the invention, a multichannel superheterodyne receiver includes an oscillator means having a plurality of different outputs corresponding in frequency to the different channels to be received by the receiver. A Schmitt trigger switching circuit controlled by a capacitor timing circuit is coupled to the oscillator means to cause the outputs to change in frequency in accordance with the predetermined pattern of operation. Receipt of a signal (carrier) by the receiver during one of the sampling intervals disables the switching circuit so that the receiver remains operative on the channel on which the carrier signal is received.

In order to extend priority to a particular channel, an additional timing circuit causes the switching means to operate the oscillator means for the priority channel intermittently for short periods of time when another channel is being received. The duration of time which the priority oscillator means is operated varies from a predetermined minimum amount to the length of time occurring until noise reappears on the sampled priority channel. Fade protection of the priority channel varies in length dependent upon the length of time that no noise is detected during the priority sampling interval. When noise reappears on the priority channel, the channel which was being received when the receiver was switched to the priority channel is again rendered operative.

DETAILED DESCRIPTION

Figure 1:
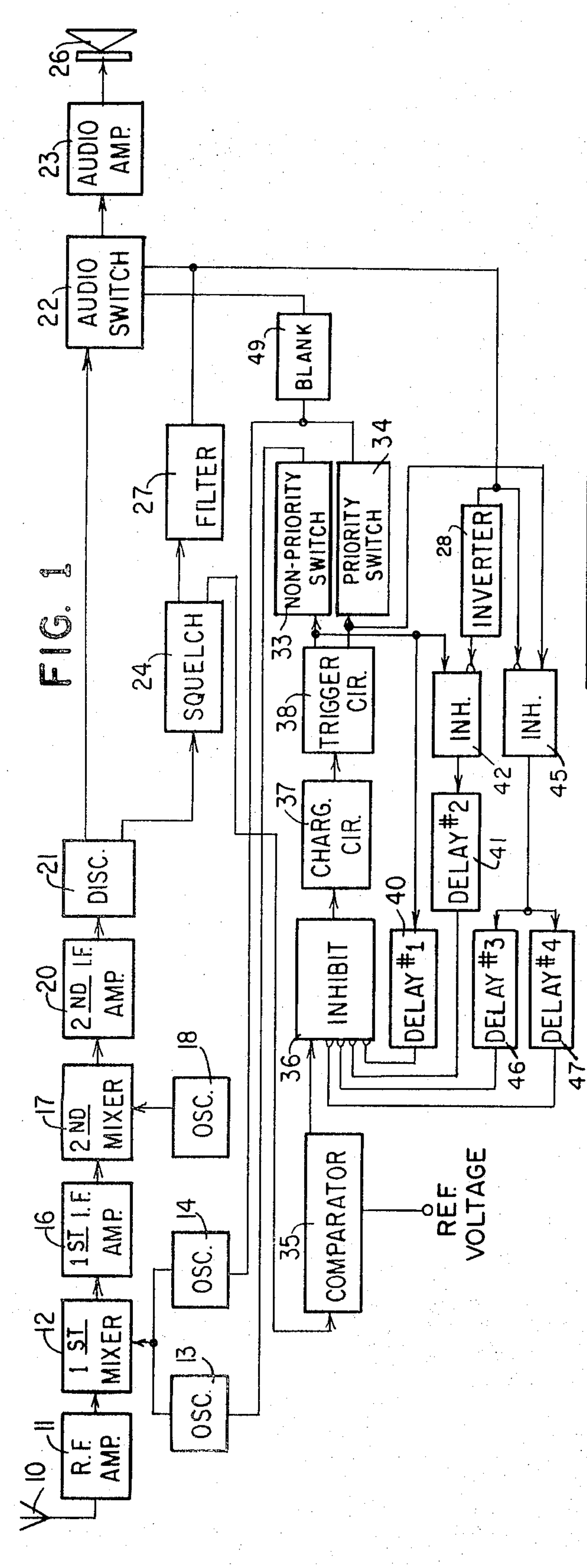
FIG. 1 is a block diagram of a multichannel receiver having priority monitoring.

Referring now to FIG. 1, there is shown a receiver of the superheterodyne type wherein signals received by an antenna 10 are amplified by a radio frequency amplifier 11 and are applied to a first mixer circuit 12. The first mixer circuit 12 is controlled by local oscillations supplied selectively thereto by a pair of local oscillators 13 and 14, only one of which is rendered operative at a time. The output of the first mixer 12 is applied through a first IF amplifier 16 and from the amplifier 16 to a second mixer 17 which is supplied with local oscillations form an oscillator 18. The output of the second mixer 17 is applied to a second IF amplifier 20 with the modulation at the output of the amplifier 20 being derived from the signal by a discriminator 21.

Signals obtained from the output of the discriminator 21 are passed through audio switch 22 to an audio amplifier 23, the output of which is supplied to a loudspeaker 26 for reproduction of the audio signal. A fast response squelch circuit 24 also is connected to the output of the discriminator 21 and closes the audio switch 22 by the application of an output signal through a low-pass filter 27 to the audio switch 22 whenever a carrier wave is received. It should be noted that the receiver shown in FIG. 1 can be used for the reception of signals other than voice signals and the various stages which have been described can be of various different known constructions.

The oscillators 13 and 14 are rendered selectively operative by the application of a ground potential to the oscillator from which an output is desired. This ground potential is obtained from an automatic switching and sampling system forming the remainder of the circuit shown in FIG. 1. Ground potential for the oscillator 13 is obtained from the output of a nonpriority switch 33 and ground potential for the oscillator 14 is obtained from the output of a priority switch 34. The switches 33 and 34 are electronic switches, only one of which provides an output ground potential at any given time.

In the event that no input signals or carrier wave signals are being received by the antenna 10, the squelch circuit 24 detects the presence of noise and provides an output through the low-pass filter 27 to the audio switch 22 to mute or prevent the passage of audio signals to the audio amplifier 23. At the same time, the output of the squelch circuit 24 is supplied to a comparator circuit 25 which also has a suitable reference voltage applied thereto, so that the comparator output is indicative of the presence or absence of noise on the channel being received in accordance with whichever one of the oscillators 13 or 14 is energized.

For the purpose of the present description, assume that the priority switch 34 is operated, causing the oscillator 14 to be operative so that the circuit is monitoring the priority channel. Also assume that no carrier is present and that the circuit has been in this condition for a time interval of a length sufficient to cause all inhibit inputs to an inhibit gate 36 to be removed. The output of the comparator circuit 35, indicating the presence of noise on the sampled channel, then is passed by the inhibit gate 36 to a charging circuit 37 to trigger the charging circuit to store a predetermined charge. When this charge is stored, a Schmitt trigger circuit 38 is switched to a nonpriority state to operate the nonpriority switch 33 and to disable the priority switch 34, When this occurs, ground is applied to the nonpriority oscillator 13 and is removed from the oscillator 14; so that the operation of the first mixer 12 is under the control of the output signal from the oscillator 13 to tune the receiver to the nonpriority channel.

Since all of the circuitry is DC coupled (no coupling capacitors), the input trigger or signal to the charging circuit 37 is a DC signal and must be removed after the charging circuit has been reset or charged. When there are no carriers present, this is accomplished by feeding back the nonpriority DC output of the trigger circuit 38 through inhibit gate 42 which passes the DC when no carriers are present to a delay circuit 41 and through a delay circuit 40, the outputs of which are applied to the inhibit gate 36 to inhibit the output of the comparator shortly after the trigger circuit 38 has been set to the nonpriority state. The delay time of the delay circuit 40 is of relatively short duration (2 ms.), but provides sufficient time to permit the charging circuit 37 to be fully charged prior to the blocking of the output of the comparator by the inhibit gate 36. The gate 36 then remains blocked until the time delay of 41 (125 ms.) after the charging circuit 37 discharges to a point sufficient to cause the Schmitt trigger circuit 38 to return to the priority state. In the example under consideration, the discharge time for the charging circuit 37 to reset the trigger circuit 38 to the priority state is approximately 275 ms.

At the time that the trigger circuit 38 returns to the priority state, the nonpriority switch 33 is rendered nonconductive or nonoperative, and the priority switch 34 applies ground to the oscillator 14, so that the first mixer 12 once again is under the control of the output of the oscillator 14. After inhibit inputs are removed from the inhibit gate 36, and if noise continues to be detected on the priority channel, the output of the comparator is applied through the inhibit gate 36 to reset the charging circuit 37, and the foregoing cycle of operation is repeated.

The length of time that the priority channel is sampled depends upon whether or not a signal is present on the nonpriority channel. The feedback paths for controlling the length of time that an inhibit signal is applied to an inhibit input of the inhibit gate 36, are through the delay circuit 40, having a time delay of 2 ms., and through a delay circuit 41 having a time delay of 125 ms. The input to the delay circuit 41 is controlled by an inhibit gate 42, the input to which is the nonpriority output of the trigger circuit 38 which is the nonpriority output of the trigger circuit 38 which is inhibited or passed in accordance with the output of the squelch circuit 24 passed through a low-pass filter 27 and an inverter 28.

If noise is detected by the squelch circuit 24, the gate 42 is open to pass the output of the trigger circuit to the delay circuit 41. Since the delay of the delay circuit 40 is considerably less than the time delay obtained from the output of the delay circuit 41, the inhibit input is applied to the inhibit gate 36 2 ms. after the nonpriority channel is turned on and it is removed 125 ms. (the delay of the circuit 41) after the nonpriority channel has been turned off. As a result, when no signal is present on the nonpriority channel, the nonpriority channel is sampled for a period of time equal to the discharge time of the charging circuit 37, and the priority channel is sampled for a time period equal to the time delay of the circuit 41 before the inhibit gate 36 is unblocked to permit the output of the comparator circuit 35 once again to trigger the charging circuit 37. The time delay of the delay circuit 41 is made long enough to provide full receiver sensitivity to the priority channel for this mode of operation, which may be termed the scanning mode of operation. It should be noted that the feedback through the delay circuit 41 occurs only when the receiver is being squelched, that is, when no signals are present.

If, at any time, a priority signal appears during the sampling interval for the priority channel during the time delay imposed by the delay circuit 41, a triggering input to the charging network is not available from the comparator 35. When the inhibit gate 36 then is opened, no signal is passed by the inhibit gate to trigger the charging circuit 37, so that the circuitry remains locked on the priority channel.

In order to provide fade protection of the priority channel, an additional inhibit gate 45 and an additional pair of delay circuits 46 and 47 are provided, each of the delay circuits 46 and 47 being supplied with the output of the inhibit gate 45. When the priority channel is being monitored or sampled, the priority control output from the trigger circuit 38 is applied to the input of the inhibit gate 45. At the same time, if a carrier signal is being received by the receiver, the output of the squelch circuit 24 applied to the inhibit input gate 45 opens the gate 45 so that the gate 45 passes the output of the trigger circuit 38. This output of the inhibit gate 45 is applied through the delay circuits 46 and 47, with the delay imposed by the delay circuit 47 being approximately 2 ms. and the delay of the delay circuit 46 being variable up to a maximum of approximately 125 ms. Thus, the priority signal must fade for a time equal to the delay period of the delay circuit 46 plus the time it takes for the squelch circuit 24 to operate before the inhibit gate 36 is opened to allow the output of the comparator to reset the charging circuit. The delay period of the delay circuit 46 is dependent on the length of time that a carrier is detected on the priority channel and is very short for a noise null or the like, increasing to its maximum amount when a priority carrier has been present a predetermined length of time.

If a carrier is detected on the nonpriority channel during the sampling interval for that channel, the inverted output of the squelch circuit 24 changes to provide an inhibiting control potential to the inhibit input of the inhibit gate 42, terminating the feedback through the inhibit gate 42.

Now assume that a nonpriority signal is present and that the priority channel is being sampled or monitored. Under this condition of operation, since no feedback takes place through the inhibit gate 42 and the delay circuit 41, the only feedback from the nonpriority output of the trigger circuit 38 is through the delay circuit 40, which provides a delay of 2 ms. as described previously. Thus, 2 ms. after the priority channel is turned on by the operation of the trigger circuit 38, the inhibit gate 36 once again is uninhibited allowing the output of the comparator 35 to be passed by the inhibit gate 36 to reset the charging circuit 37.

The delay time of the delay circuit 40 is chosen to be slightly larger than the start up time of the oscillator 14 so that the comparator circuit 35 has sufficient time to indicate the actual conditions on the priority channel. Since, in the situation under consideration, prior to the time that the priority channel was turned on, the comparator was already sensing a signal condition on the nonpriority channel, the response time to another signal condition on the priority channel is less than if the comparator had been monitoring noise. For this reason, the time interval or the time delay of the delay circuit 40 can be considerably smaller than the delay of the circuit 41 without degrading the sensitivity of the system excessively.

If noise is present on the priority channel at the time the inhibit gate 36 is opened, the squelch circuit 24 provides a signal to the comparator 35 which then is passed by the inhibit gate 36 to trigger or reset the charging circuit 37. The time which elapses from the time that the priority channel first is sampled until the time that the charging circuit 37 is reset, causing the nonpriority channel to be sampled, is approximately 8 ms. under the conditions of operation described above. To prevent noise from being amplified by the audio amplifier 23 and applied to the loudspeaker 26 during this sampling interval, a blanking circuit 49 is responsive to the output of the priority switch 34 and provides a blanking pulse which is approximately 2 ms. longer than the actual priority "on" sampling time in order to compensate for the start up time of the nonpriority channel oscillator 13. Thus the output of the blanking circuit 49 lasts for approximately 10 ms. and is used to blank the audio of the nonpriority channel during the sampling interval for the priority channel.

So long as the nonpriority signals are present on the nonpriority channel, this 8 ms. sampling of the priority channel occurs every time the charging circuit 37 resets the trigger circuit 38 (every 275 ms. in the above example). In addition, fade protection for the nonpriority channel is provided by the reset time of the charging circuit 37.

If, during the sampling interval for the priority channel, a carrier is detected, the output of the squelch circuit 24 opens the inhibit gate 45. This permits the output of the trigger circuit 38 applied to the priority switch 34 to be passed by the inhibit gate 45 through the delay circuits 46 and 47 to the inhibit gate 36, so that the charging circuit cannot be reset until the priority fade protection provided by the delay circuit 46 is exceeded after termination of the signal on the priority channel. Thus, the circuit locks onto the priority channel and remains on the priority channel so long as a carrier is present thereon, even though a signal may have been present on the nonpriority channel at the time the priority channel was sampled. Reception of a signal on the priority channel preempts the reception of any signals on the nonpriority channel.

Figure 2:
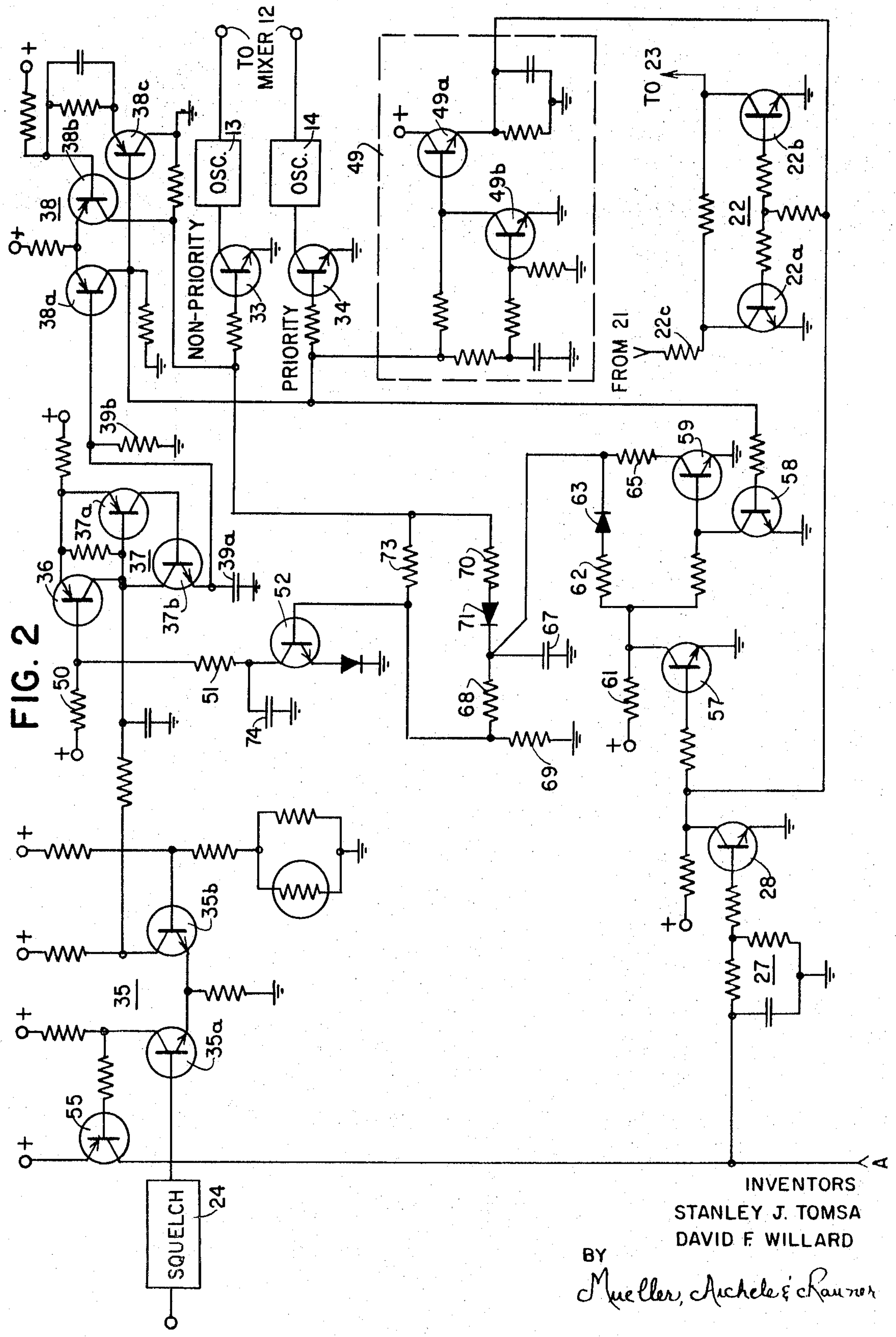
FIG. 2 is a detailed schematic diagram of the priority monitoring section of the receiver shown in FIG. 1.

In FIG. 2 there is shown a detailed schematic diagram of the priority channel sampling and monitoring circuit performing the functions shown in the block diagram of FIG. 1. With respect to the gates and delay circuits shown in FIG. 1, however, there is not a one for one correction in the circuit shown in FIG. 2 since some of the gating functions and delays provided by the separate gate and delay circuits of FIG. 1 are combined in the circuitry shown in FIG. 2. The circuit of FIG. 2, however, operates functionally in a manner which is substantially the same as the description of operation given above in conjunction with FIG. 1. The circuit elements of FIG. 2 which have a direct counterpart in the circuit of FIG. 1 have been given the same reference numerals in order to facilitate an understanding of the correlation of the circuits of FIGS. 1 and 2.

Referring now to FIG. 2, assume that no signals are present on either the nonpriority or priority channels and that the charging circuit has been reset and is in the process of discharging. With the circuit in this state of operation, the inhibit gate in the form of a PNP-transistor 36 has a forward biasing potential applied to its base through a voltage divider extending from a source of positive potential through a pair of resistors 50 and 51, a now conductive NPN-transistor 52 and a diode 53 to ground. When the transistor 56 is conductive, the potential applied to the base of a PNP transistor 37*a* in the charging circuit 37 is substantially the same as the potential applied to the emitter thereof so that the transistor 37*a* is nonconductive. This, in turn, causes an NPN transistor 37*b*, controlled by the potential present on the collector of the transistor 37*a*, to be nonconductive so that a timing capacitor 39*a* is permitted to discharge through a resistor 39*b*.

As stated previously in conjunction with the description of operation of the circuit shown in FIG. 1, the discharge time of the capacitor 39*a* in the timing circuit is chosen to be approximately 275 ms. At the end of the timing interval for the discharge of the capacitor 39*a*, the potential applied to the base of a PNP-transistor 38*a* in the Schmitt trigger circuit 38 drops to a point sufficiently near ground to forward bias the transistor 38*a*. When this occurs, the transistor 38*a* is rendered conductive and the other transistor 38*b* of the trigger circuit is rendered nonconductive due to the fact that a control transistor 38*c* is rendered less conductive, causing the potential on the base of the transistor 38*b* to rise to a positive potential, which in combination with the drop in emitter potential of the transistor 38*b* due to current flow in the transistor 38*a*, is sufficient to back-bias the PNP-transistor 38*b*.

At this time the potential on the collector of the transistor 38*a* rises to a positive level, while the potential present on the collector of the transistor 38*b* approaches ground potential. This in turn causes an NPN-switching transistor 34, associated with the priority channel, to be rendered conductive, causing ground potential to be applied to the priority channel oscillator 14. At the same time, the NPN-switching transistor 33 for the nonpriority channel is rendered nonconductive, removing ground potential from the oscillator 13; so that control of the circuit operation now is changed from the oscillator 13 to the oscillator 14.

Assume that no signal is present on the priority channel at the time that the switching circuit 38 switches from the nonpriority to the priority channel. As a consequence, the output of the squelch circuit 24 is negative (detecting noise) causing the transistor 35*a* in the differential amplifier comparator circuit 35 to be rendered nonconductive. This, in turn, causes the transistor 35*b* of the comparator circuit to be rendered conductive due to the fact that the reference potential applied to the base of the transistor 35*b* through a temperature compensated voltage divider coupled thereto is more positive than the potential obtained from the output of the squelch circuit 24 when noise signals (no carrier signals) are present on the received channel. At the same time, the potential on the collector of the transistor 35*a* back-biases a PNP-control transistor 55 which renders the transistor 55 nonconductive. Ground potential then is applied from the collector of the transistor 55 through the low-pass filter circuit 27 to the base of an NPN-inverter transistor 28, biasing the transistor 28 nonconductive. A pair of NPN-transistors 22*a* and 22*b* in the audio switch circuit are then provided with a positive forward biasing potential from the collector of the transistor 28 and are rendered conductive, shunting the output of the discriminator circuit 21, after a resistor 22*c* which provides working impedance and the audio amplifier circuit 23 to ground thereby preventing the reproduction of the noise signal in the loudspeaker 26. In signals so long as the inverter transistor 28 is nonconductive the positive potential on the collector thereof is coupled through a base resistor to the base of an NPN-transistor 57, rendering the transistor 57 conductive. This operation of the transistors 55, 28 and 57 occurs whenever noise is detected by the squelch circuit 24.

During the time that the nonpriority channel was being sampled, ground potential was being applied to the base of a control transistor 58 from the collector of the nonconductive trigger transistor 38*a*, rendering the transistor 58 nonconductive. This in turn causes the potential on the base of a second NPN-control transistor 59 to be controlled by the transistor 57. If the transistor 57 is conductive (noise being detected), the transistor 59 is nonconductive and vice versa. In the example presently under consideration, with the transistor 57 conductive and the transistor 59 nonconductive during the nonpriority interval, a time delay capacitor 67 is fully charged through a resistor 70 and a diode 71 to a predetermined positive potential.

When the switch 38 is triggered to the priority state by the discharge of the timing capacitor 39*a*, the positive biasing potential applied to the base of the transistor 52 from the collector of the transistor 38*b* is removed, but the transistor 52 is still rendered conductive by the positive potential obtained from the capacitor 67 and applied to the base of the transistor 52 through a coupling resistor 68. A relatively positive potential also is applied to the base of the transistor 58 which renders that transistor conductive placing ground potential on the base of the transistor 59 to hold the transistor 59 nonconductive to maintain open the path from the junction of the capacitor 67 and the resistor 65 to ground. Thus, the capacitor 67 commences discharging to ground through the resistor 68 and a resistor 69 to ground.

When the potential at the junction between the resistors 68 and 69 drops to a point at which the transistor 52 no longer is forward biased (approximately 123 ms. after the change of state of the switch 38), the transistor 52 is rendered nonconductive. The time necessary for this to occur is substantially equivalent to the delay of FIG. 1, delay circuit 41 shown in FIG. 1. so that the capacitor 67 functions as the delay circuit 41 described conjunction with FIG. 1. A second time delay capacitor 74 connected between ground and the collector of the transistor 52 then is charged through the resistors 50 and 51, with the time required to fully charge the capacitor 74 to a point at which the transistor 36 is back-biased rendering it nonconductive is approximately an additional 2 ms. This time delay is equivalent to the delay imposed by the time delay circuit 40 of FIG. 1 and, added to the delay provided by the capacitor 67, provides the full 125 ms. delay of the delay circuit 41 of FIG. 1.

As a result of this operation, the priority channel is sampled for approximately 125 ms. when no nonpriority signal is present at the time that the switch 38 switches to the priority state. At the time that the transistor inhibit gate 36 is rendered nonconductive, the charging circuit 37 consisting of the transistors 37a and 37b, is rendered responsive to the output of the comparator circuit 35 obtained from the collector of the transistor 35b. If no signals are present on the priority channel at this time, the output of the squelch circuit 24 continues to be negative, back-biasing the transistor 35a, so that the transistor 35b is conductive causing a forward biasing potential to be applied to the base of the transistor 37a. As a result, the transistors 37a and 37b are rendered conductive to charge the capacitor 39a. As soon as the capacitor 39a is charged, the positive potential at the junction of the capacitor 39a and the resistor 39b applied to the base of the transistor 38a renders the transistor 38a nonconductive and the transistor 38b for the nonpriority channel is rendered conductive. Thus, sampling is returned to the nonpriority channel for a length of time determined by the discharge time of the circuit consisting of the capacitor 39a and a resistor 39b.

As soon as the transistor 38b is rendered conductive, a positive potential is applied to the base of the transistor 52 through a coupling resistor 73 once again rendering the transistor 53, conductive, discharging the capacitor 74 and applying a forward-biasing potential to the base of the transistor 36, thereby short-circuiting the emitter-base path of the transistor 37a to inhibit or disable the switch 37. At the same time (if noise is still present), the capacitor 67 commences charging and is fully charged by the time capacitor 39a discharges in order to initiate the 125 ms. cycle of operation for the priority channel when the cycle repeats itself.

Now assume that a signal is present on the nonpriority channel during the time that the capacitor 39a is discharging. In this event, the output of the squelch circuit 24 is positive, causing the transistors 35a, 55 and 28 to be rendered conductive, and the transistor 57 to be rendered nonconductive. This then removes the positive biasing potential from the bases of the audio switch transistors 22a and 22b, so that the audio channel is closed to permit reproduction of the audio signals by the loudspeaker 26.

At the same time, as stated previously, the transistor 58 is rendered nonconductive and with the transistors 57 and 58 both nonconductive, a positive forward biasing potential is applied to the base of the transistor 59 causing it to conduct. The collector-emitter oath of the transistor 59 in series with a low-impedance resistor 56 is connected across the capacitor 67 and forms essentially a short circuit shunt across the capacitor 67, preventing the charging of the capacitor 67 by the output obtained from the collector of the nonpriority transistor 38b. Thus, when the timing circuit times out, causing the transistor 38a to be rendered conductive and the transistor 38b nonconductive, the transistor 52 is immediately rendered nonconductive; so that the transistor 36 is rendered nonconductive as soon as the capacitor 74 is charged through the resistors 50 and 51.

As a result, the time interval for sampling the priority channel when a nonpriority signal is present is substantially shorter than the time interval for sampling the priority channel when no nonpriority signal is present. The parameters of the circuit are chosen to cause this shorter sampling interval to be approximately 8 ms., so that the sampling interval is not noticed in the audio output obtained from the loudspeaker 26.

When the priority channel first is sampled, the one-shot blanking multivibrator 49 including the transistors 49a and 49b provides a 10 ms. positive blanking pulse, as described previously. If noise is present on the priority channel, the transistors 35b and 57 are rendered conductive. With the potential on the collector of the transistor 57 at ground and with the potential applied to the resistor 70 from the collector of the nonconductive transistor 38b, the capacitor 67 cannot be charged and no positive potential is applied to the base of the transistor 52. Thus, as soon as the capacitor 74 has been charged, rendering the transistor 36 nonconductive, the potential present on the collector of the transistor 35b controls the conduction of the charging circuit switching transistors 37a and 37b. For a "no signal" condition, the potential present on the collector of the transistor 35b is slightly lower than the potential present on the emitter of the transistor 37a, so that the transistor 37a is a forward-baised which in turn forward biases the transistor 37b recharging the capacitor 39a and the cycle is repeated.

If, during the sampling of the priority channel, a signal is present on the priority channel, the output of the squelch circuit 24 rises to a positive potential. This, in turn, renders the transistor 57 nonconductive. At this time, since the transistor 59 is also nonconductive during the priority sampling interval, the capacitor 67 is charged through the resistors 61, 62 and the diode 63 toward the value of the positive potential so long as a signal is present. This positive potential also forward biases the transistor 52. If the charging of the capacitor 67 commences because of a noise null or a rapidly fading priority signal, the output of the squelch circuit shortly thereafter once again becomes negative, rendering the transistor 57 conductive to place ground potential at the junction of the resistors 61 and 62 thereby terminating the charging of the capacitor 67. Thus, for a noise null or similar condition, the capacitor 67 is not fully charged, and commences discharging through the resistors 68 and 69 to render the transistor 52 nonconductive almost immediately so that the sampling interval is practically the same as if no noise null had been detected.

On the other hand, if a true priority signal is present, sufficient time elapses to fully charge the capacitor 67, so that when the priority signal subsequently terminates, the fading protection provided by the fully charged capacitor 67 persists for the time interval required for the capacitor 67 to discharge through the resistors 68 and 69 to ground. This time interval is 123 ms., as stated previously, and corresponds substantially to the delay of the delay circuit 46 shown in FIG. 1. Thus, the capacitor 67 operates to perform the dual functions of the delay circuits 41 and 46 shown in FIG. 1. When the capacitor 67 has discharged sufficiently to terminate the forward bias on the transistor 52, the transistor 52 is rendered nonconductive; and the additional 2 ms. of delay is provided by the time it takes to charge the capacitor 74. When the capacitor 74 is charged, the inhibit gate 36 is rendered nonconductive, causing the PNP-transistor 37a once again to be responsive to the signals obtained from the collector of the transistor 35b in the comparator circuit 35.

Since a noise condition is present on the priority line at this time, the output of the squelch circuit 24 causes the transistor 35b to be conductive to forward-bais the transistors 37a and 37b to charge the capacitor 39a. The trigger circuit 38 then is switched to the nonpriority sampling state; and the sampling cycles automatically commence, with the time spent for sampling the priority channel being dependent upon the presence or absence of a signal on the nonpriority channel in accordance with the foregoing description of operation.

The foregoing description has been limited to a two-channel receiver with one of the channels being assigned a priority status. It is possible, however, to expand the number of channels to any desired practical number, and the circuit shown in FIG. 3 (considered in conjunction with the other FIGS.) is illustrative of a five-channel receiver, having a provision for scanning four channels during the nonpriority time slot. In the circuit shown in FIG. 3, a timer control signal is obtained from terminal A connected to the collector of the transistor 55 in FIG. 2 and is applied through an isolating diode 80 and a filter circuit 81 to the base of an NPN-control transistor 82. When noise is being detected by the squelch circuit 24, the transistor 55 is nonconductive, as stated previously; so that a near ground potential is applied to the base of the transistor 82, biasing the transistor into a state of nonconduction. This causes substantial ground potential to be obtained from the output at the emitter of the transistor 82. This output is applied to the two control inputs of a NOR-gate astable multivibrator 84 to enable the multivibrator 84 for free running operation. The multivibrator 84 in turn controls the operation of a bistable multivibrator 86, the outputs of which are utilized to drive a four-stage NOR-gate ring counter 88, which sequentially applies a positive potential through a suitable isolating resistor to the bases of four control transistors 90, 91, 92 and 93, each associated with a different one of the outputs of the ring counter 88.

Figure 3:
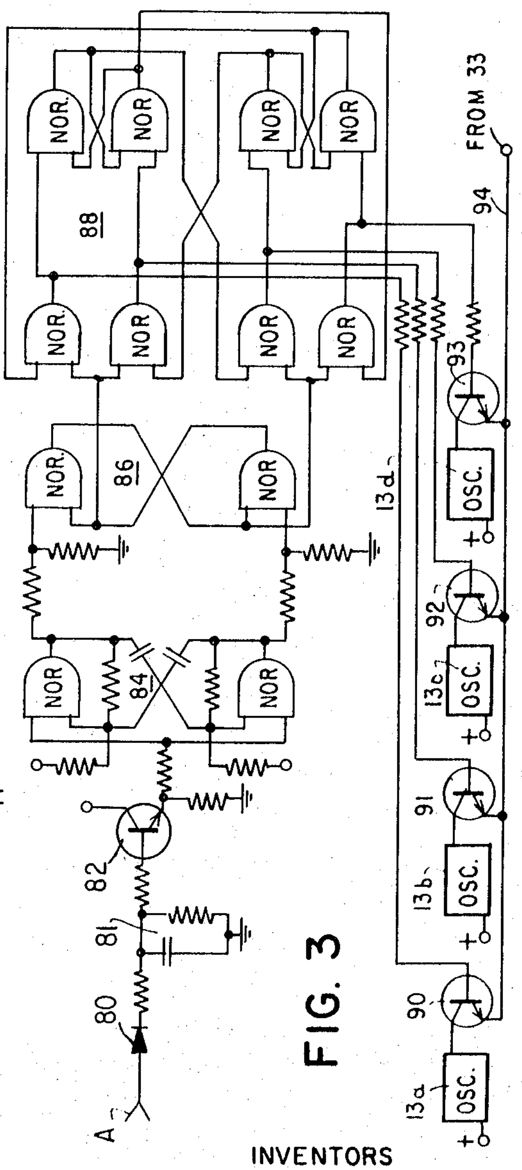
FIG. 3 is a modification of the circuits shown in FIGS. 1 and 2 to extend the number of channels which can be received by the receiver shown in FIG. 1.

When the channel scanning circuitry shown in FIG. 2 is in a nonpriority state, ground potential is obtained from the collector of the nonpriority control transistor 33 and is applied to the lead 94 in FIG. 3 instead of being applied directly to an oscillator 13 as shown in FIG. 2. This ground potential then provides a return path for the emitters of all of the transistors 90, 91, 92 and 93, but only the one of those transistors is rendered conductive which also has a positive forward biasing potential applied to its base from the selected output of the NOR-gate ring counter 88.

In place of a single oscillator 13, four oscillators 13*a* to 13*d* are provided and are controlled by the transistors 90 to 93, so that the energized transistor provides a ground potential to the oscillator connected to its collector energizing that oscillator, causing the channel associated with the conductive transistor 90 to 93 to be scanned. Whenever a carrier signal is detected on the particular channel being scanned, the output of the squelch circuit 24 rises to a positive potential, causing a positive potential to be obtained from the collector of the transistor 55, which in turn forward-biases the transistor 83. This causes a positive potential to appear on the emitter thereof, disabling the operation of the astable multivibrator 84. This in turn causes the sequential operation of the counter to stop on the selected channel, so that the system now operates with continuous reception being obtained from the selected channel, interrupted by periodic short intervals of sampling of the priority channel taking place in accordance with the description given previously in conjunction with FIG. 2.

The circuit 81 provides sufficient fade protection to hold the nonpriority channel selected through a fade and through sampling of the priority channel. the scanning rate of the nonconductive channels associated with the control transistors 90 to 93 may be as fast as one every 10 ms. with close to full squelch sensitivity. One of the four channels also could be assigned priority status by utilizing it as a second source of ground potential for the priority oscillator 14 in order to provide a faster access time to the priority channel for the situation in which no signals are present on a nonpriority channel.

From the foregoing description, it may be seen that the multiple channel monitor circuit, including a priority channel which may preempt any other of the channels which the circuit can receive, operates to provide a variable sampling length for sampling the priority channel when a nonpriority signal is present by causing the sampling circuitry to remain on the priority channel until noise is detected on that channel. The length of time that the priority channel is monitored causes the fade protection for the priority channel to be dependent on the length of time that the circuitry has been monitoring a carrier on the priority channel. The variable fade protection is dependent on the parameters of the charging path for the capacitor 67, with maximum fade interval being determined by the discharge time of the fully charged capacitor 67.

We claim:

1. A radio receiver of the superheterodyne type for receiving signals on a predetermined number of channels, one of which is designated a priority channel, said receiver having a channel scanning and priority channel monitoring circuit including in combination:

mixing means operative to provide reception by said radio receiver on said different channels;

oscillator means connected to the mixing means for providing output signals to the mixing means at different frequencies corresponding to said different channels;

switching means having at least first and second conditions of operation coupled to the oscillator means for controlling the output frequency of the oscillator means in accordance with the condition of operation of the switching means, one of the conditions of operation of the switching means corresponding to the priority channel;

first timing control circuit means having a cycle of operation and connected with the switching means for controlling the durations of time of the conditions of operation of the switching means in accordance with said cycle of operation, means for detecting the presence of a received signal at the output of the mixing means;

second timing control circuit means controlled by the outputs of the switching means and the signal detecting means for causing the cycle of operation of the first timing control circuit means to be at a first predetermined time pattern when no signals are present on any of the channels and to be at a second predetermined time pattern when a signal is present on a nonpriority channel;

means responsive to the outputs of the switching means and the signal detecting means for disabling control of the switching means by the first timing control circuit when the switching means is set to the condition corresponding to the priority channel at the time the signal detecting means provides an output indicative of the presence of a received signal; and means responsive to the output of the switching means when the switching means is set to the condition of operation corresponding to a priority channel, and further responsive to the output of the signal detecting means for varying the second predetermined time pattern with respect to the duration of time that the switching means is set to the condition of operation corresponding to the priority channel, said duration of time being dependent upon the length of time that a signal is sensed by the detecting means during the priority channel condition of operation of the switching means.

2. The combination according to claim 1 wherein the switching means is a trigger circuit providing a priority and a nonpriority output and wherein the first timing control circuit includes a first timing capacitor having a charging path and a discharge path therefor, the charge on the timing capacitor being used to control the operation of the trigger circuit.

3. The combination according to claim 2 wherein the trigger circuit provides a nonpriority output when the first timing capacitor is charged and provides a priority output when the first timing capacitor is discharged.

4. The combination according to claim 2 wherein a plurality of nonpriority channels are provided and further including means responsive to the nonpriority output of the trigger circuit to sequentially control the oscillator means to provide output frequencies corresponding to the different nonpriority channels during said nonpriority output, the sequential control means being disabled in response to detection of a signal by the detecting means.

5. The combination according to claim 2 wherein the disabling means includes an inhibit gate and control switching means in the charging path of the first timing capacitor and operated in response to the output of the signal detecting means, wherein the output of the signal detecting means is applied through said inhibit gate to the control switching means with the inhibit input of said inhibit gate being obtained from the second timing control means.

6. The combination according to claim 5 wherein the control switching means is operated to complete the charging path for the first timing capacitor in response to an output from the signal detecting means indicating the absence of a detected signal.

7. The combination according to claim 5 wherein the second timing control circuit includes a second timing capacitor provided with a first charging path from the nonpriority output of the trigger circuit, and means responsive to the output of the signal detecting means for disabling said first charging path in response to detection of a signal by the detecting means, the charge on the second timing capacitor controlling the length of time an inhibit input is applied to the inhibit gate following the time the trigger circuit is switched from the non-priority to the priority state by the first timing control circuit.

8. The combination according to claim 7 further including a second charging path for the second timing capacitor and means responsive to the output of the signal detecting means and the priority output of the trigg circuit for completing the second charging path whenever the trigger circuit provides a priority output and the detecting means detects the presence of a received signal to control the length of time an inhibit input is applied to the inhibit gate following termination of a detected signal on the priority channel.

9. The combination according to claim 8 wherein the time constants of the first charging path for the second timing capacitor permit the second timing capacitor to be fully charged to a predetermined value in the absence of a detected signal during the nonpriority output of the trigger circuit.

* * * * *